United States Patent
Zhou et al.

(10) Patent No.: US 10,797,991 B2
(45) Date of Patent: Oct. 6, 2020

(54) SETTING LINK AGGREGATION GROUP (71) Applicant: NEW H3C TECHNOLOGIES CO., LTD., Hangzhou (CN)

(72) Inventors: Mengtao Zhou, Beijing (CN); Zhenglin Qi, Beijing (CN); Yihong Xiu, Beijing (CN); Daogui Liu, Beijing (CN)

(73) Assignee: NEW H3C TECHNOLOGIES CO., LTD., Hangzhou (CN)

( * ) Notice: Subject to any disclaimer, the term of this patent is extended or adjusted under 35 U.S.C. 154(b) by 0 days.

(21) Appl. No.: 16/082,916

(22) PCT Filed: Mar. 31, 2017

(86) PCT No.: PCT/CN2017/079011
§ 371 (c)(1),
(2) Date: Sep. 6, 2018

(87) PCT Pub. No.: WO2017/167275
PCT Pub. Date: Oct. 5, 2017

(65) Prior Publication Data
US 2019/0089625 A1   Mar. 21, 2019

(30) Foreign Application Priority Data

Mar. 31, 2016  (CN) .......................... 2016 1 0201752
Mar. 31, 2016  (CN) .......................... 2016 1 0201761
Mar. 31, 2016  (CN) .......................... 2016 1 0202165

(51) Int. Cl.
*H04L 12/709*  (2013.01)
*H04L 12/721*  (2013.01)
*H04L 12/46*   (2006.01)

(52) U.S. Cl.
CPC ........ *H04L 45/245* (2013.01); *H04L 12/4625* (2013.01); *H04L 12/4645* (2013.01); *H04L 12/4679* (2013.01); *H04L 45/66* (2013.01)

(58) Field of Classification Search
USPC ......................................................... 370/395
See application file for complete search history.

(56) References Cited

U.S. PATENT DOCUMENTS 8,467,286 B2 * 6/2013 Elie-Dit-Cosaque ........................ H04L 12/40006
370/217
9,077,650 B2 * 7/2015 Budhia ................. H04L 49/253
(Continued)

FOREIGN PATENT DOCUMENTS

CN   102684979 A    9/2012
CN   102769558 A   11/2012
(Continued)

OTHER PUBLICATIONS

"IEEE Standard for Local and Metropolitan area networks—Virtual Bridged Local Area Networks—Bridge Port Extension," IEEE Communications Surveys & Tutorials, Jul. 16, 2012, 136 pages.
(Continued)

*Primary Examiner* — Jeffrey M Rutkowski
*Assistant Examiner* — Luna Weissberger
(74) *Attorney, Agent, or Firm* — McCoy Russell LLP (57) ABSTRACT

In an extended bridge comprising a controlling bridge and a port extender, the controlling bridge associates an aggregation port of a link aggregation group with a plurality of extended ports connecting to a same terminal on the port extender, and assigns an aggregation port identifier to the aggregation port. The controlling bridge associates an extended port identifier of each of the plurality extended ports and a cascaded port connecting to the port extender with the aggregation port. The controlling bridge associates
(Continued)

the aggregation port with the aggregation port identifier and the cascaded port to determine to add the aggregation port identifier into a downstream unicast packet of which an egress port exiting the extended bridge is the aggregation port and to via determine to send the downstream unicast packet with the aggregation port identifier via the cascaded port.

12 Claims, 4 Drawing Sheets

(56) References Cited

U.S. PATENT DOCUMENTS

| | | | |
|---|---|---|---|
| 9,294,396 | B2 | 3/2016 | Sundaram et al. |
| 9,515,890 | B2 | 12/2016 | Ao et al. |
| 2013/0322457 | A1* | 12/2013 | Budhia ............... H04L 49/253 370/401 |
| 2014/0044129 | A1 | 2/2014 | Mentze et al. |
| 2014/0086098 | A1* | 3/2014 | Ao ..................... H04L 12/4625 370/254 |
| 2014/0269710 | A1 | 9/2014 | Sundaram et al. |
| 2015/0163072 | A1 | 6/2015 | Kalkunte et al. |
| 2015/0195178 | A1 | 7/2015 | Bhattacharya et al. |
| 2015/0339249 | A1 | 11/2015 | Dharmadhikari et al. |
| 2017/0085467 | A1* | 3/2017 | Ford ..................... H04L 45/245 |

FOREIGN PATENT DOCUMENTS

| | | |
|---|---|---|
| CN | 102821022 A | 12/2012 |
| CN | 103166874 A | 6/2013 |
| CN | 103457818 A | 12/2013 |
| CN | 104780111 A | 7/2015 |
| EP | 2533472 A1 | 12/2012 |
| JP | 2006135723 A | 5/2006 |

OTHER PUBLICATIONS

ISA State Intellectual Property Office of the People's Republic of China, Written Opinion of the International Searching Authority Issued in Application No. PCT/CN2017/079011, dated May 31, 2017, WIPO, 5 pages.

State Intellectual Property Office of the People's Republic of China, Office Action Issued in Application No. 201610202165.6, dated Dec. 20, 2018, 10 pages.

European Patent Office, Extended European Search Report Issued in Application No. 17773305.2, dated Jan. 30, 2019, Germany, 11 pages.

ISA State Intellectual Property Office of the People's Republic of China, International Search Report Issued in Application No. PCT/CN2017/079011, dated May 31, 2017, WIPO, 4 pages.

State Intellectual Property Office of the People's Republic of China, Office Action and Search Report Issued in Application No. 201610202165.6, dated Jul. 30, 2018, 12 pages. (Submitted with Partial Translation).

Japanese Patent Office, Office Action Issued in Application No. 2018-551193, dated Jul. 23, 2019, 13 pages. (Submitted with Machine Translation).

State Intellectual Property Office of the People's Republic of China, Office Action and Search Report Issued in Application No. 201610201761.2, dated Aug. 1, 2019, 17 pages. (Submitted with Partial Translation).

State Intellectual Property Office of the People's Republic of China, Office Action and Search Report Issued in Application No. 201610201761.2, dated Nov. 19, 2018, 19 pages. (Submitted with Partial Translation).

Thai, Fl et al., "RBridge: Pseudo-Nickname for Active-active Access draft-hu-trill-pseudonode-nickname-08," TRILL Norking Group, Internet-Draft, Intended Status: Standards Track, Jun. 24, 2014, 28 pages.

"Multi-Chassis Link Aggregation," Arista Website, Available Online at https://www.arista.com/en/products/multi-chassis-link-aggregation-mlag, Sep. 23, 2015, 4 pages.

State Intellectual Property Office of the People's Republic of China, Office Action and Search Report Issued in Application No. 201610201752.3, dated Dec. 27, 2019, 15 pages. (Submitted with Partial Translation).

Japanese Patent Office, Office Action Issued in Application No. 2018-551193, dated Jan. 21, 2020, 9 pages. (Submitted with Machine Translation).

State Intellectual Property Office of the People's Republic of China, Office Action and Search Report Issued in Application No. 201610201761.2, dated Feb. 3, 2020, 9 pages. (Submitted with Partial Translation).

State Intellectual Property Office of the People's Republic of China, Office Action and Search Report Issued in Application No. 201610201752.3, dated Jun. 4, 2020, 12 pages. (Submitted with Machine Translation).

* cited by examiner

SETTING LINK AGGREGATION GROUP

CROSS REFERENCE TO RELATED APPLICATIONS

The present application is a U.S. National Phase of International Patent Application Serial No. PCT/CN2017/079011 entitled "CONFIGURATION OF LINK AGGREGATION GROUP," filed on Mar. 31, 2017. International Patent Application Serial No. PCT/CN2017/079011 claims priority to Chinese Patent Application No. 201610201752.3, filed on Mar. 31, 2017, Chinese Patent Application No. 201610201761.2 filed Mar. 31, 2016, and Chinese Patent Application No. 201610202165.6 filed on Mar. 31, 2016. The entire contents of each of the above-cited applications are hereby incorporated by reference in their entirety for all purposes.

BACKGROUND

An extended bridge can be formed by a Controlling Bridge (CB) and a Port Extender (PE). The controlling bridge may be a single network device or may be formed by a plurality of network devices.

DETAILED DESCRIPTION OF THE EMBODIMENTS

The present disclosure will be described below with reference to a plurality of examples shown in the drawings.

In the used terms, the term "comprising" means including but not limited to; the term "containing" means including but not limited to; and the term "based on" means at least a part thereof based on. In addition, the term "one" is intended to mean one of particular integral parts.

Figure 1:
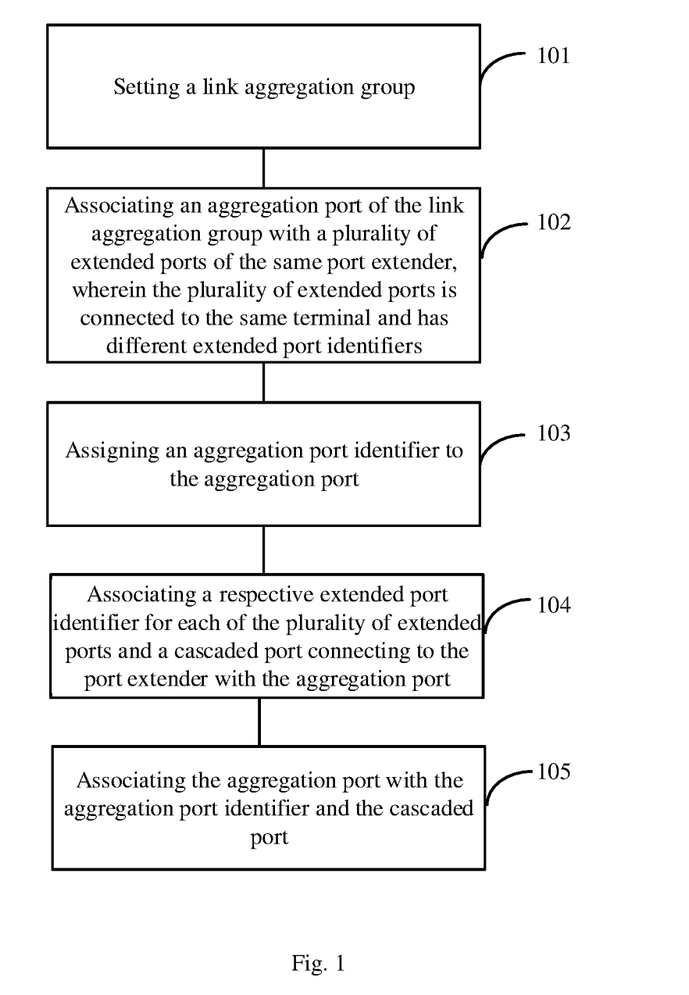
FIG. 1 is an example flowchart of setting a link aggregation group according to the present disclosure.

FIG. 1 is an example flowchart of setting a link aggregation group according to the present disclosure. A controlling bridge and a port extender applied by the example form an extended bridge. As shown in FIG. 1, this example comprises the following Blocks.

At block 101, a link aggregation group may be set.

At block 102, an aggregation port of the link aggregation group may be associated with a plurality of extended ports of the port extender, wherein the plurality of extended ports are connected to the same terminal.

At block 103, an aggregation port identifier may be assigned to the aggregation port.

At block 104, an extended port identifier for each of the plurality of extended ports and a cascaded port connected to the port extender may be associated with the aggregation port to identify that an ingress port by which an upstream packet received by any of the plurality of extended ports enters the extended bridge is the aggregation port.

At block 105, the aggregation port may be associated with the aggregation port identifier and the cascaded port to determine to add the aggregation port identifier to a downstream unicast packet of which an egress port exiting the extended bridge is the aggregated port and to determine to send the downstream unicast packet added with the aggregation port identifier via the cascaded port.

The example shown in FIG. 1 may be applied in an extended bridge system so that the port extender of an extended bridge may load-share the downstream packets sent to the terminal, and may load-share the upstream packets received from the terminal via a link aggregation group.

Figure 2A:
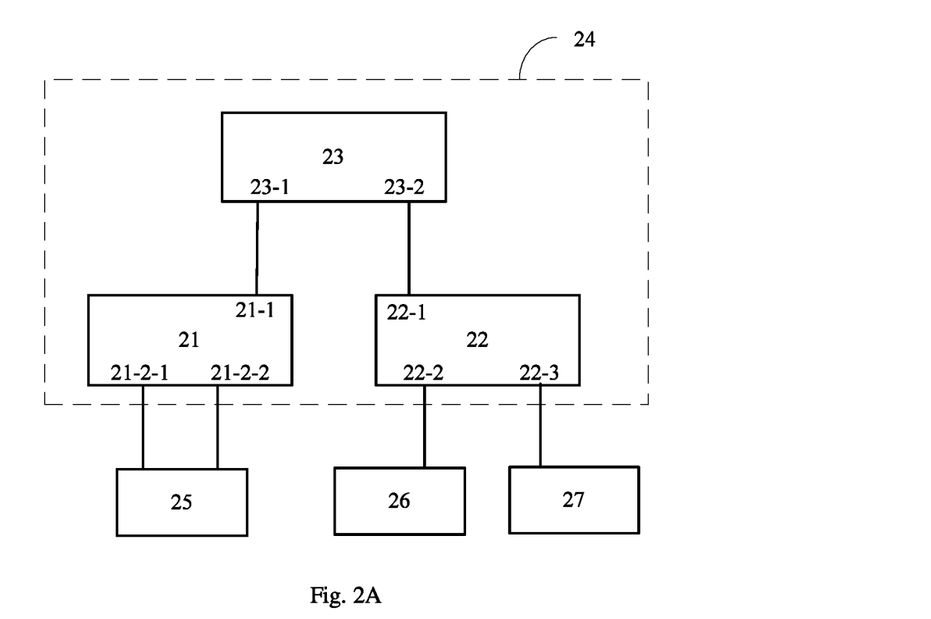
FIGS. 2A and 2B are diagrams of an example of an extended bridge setting a link aggregation group according to the present disclosure.

In FIG. 2A, the port extenders 21 and 22 and the controlling bridge 23 form an extended bridge 24. The upstream port 21-1 of the port extender 21 is connected with the cascaded port 23-1 of the controlling bridge 23 via a link. The upstream port 22-1 of the port extender 22 is connected with the cascaded port 23-2 of the controlling bridge 23 via a link.

The port extender 21 may send an extended port create request message to the controlling bridge 23 for the extended ports 21-2-1 and 21-2-2, respectively. The port extender 21 may send the extended port create request messages to the controlling bridge 23 via the upstream port 21-1.

The port extender 22 may send an extended port create request message to the controlling bridge 23 for the extended ports 22-2 and 22-3, respectively. The port extender 22 may send these extended port create request messages via the upstream port 22-1.

The controlling bridge 23 may receive the extended port create request messages from the port extender 21 via the cascaded port 23-1 and receive the extended port create request messages from the port extender 22 via the cascaded port 23-2.

The controlling bridge 23 may create an E-channel for the extended ports 21-2-1 and 21-2-2, respectively, and may assign ECID-21-2-1 and ECID-21-2-2 to the extended ports 21-2-1 and 21-2-2, respectively, based on the port namespace of the cascaded port 23-1 to identify the E-channels created for the extended ports 21-2-1 and 21-2-2. The controlling bridge 23 may also set an virtual port VP21-2-1 and an virtual port VP21-2-2 for the extended ports 21-2-1 and 21-2-2, respectively, so that the extended ports 21-2-1 and 21-2-2 behave as virtual ports VP21-2-1 and VP21-2-2 on the controlling bridge 23.

The controlling bridge 23 may create E-channels for the extended ports 22-2 and 22-3 and may assign ECID-22-1 and ECID-22-3 to the extended ports 22-2 and 22-3, respectively, based on the port namespace of the cascaded port 23-2 to identify the E-channels created for the extended ports 22-2 and 22-3. The controlling bridge 23 may also respectively set an virtual port VP22-2 for the extended port 22-2 and set an virtual VP22-3 for the extended ports 22-3, so that the extended ports 22-2 and 22-3 behave as virtual ports VP22-2 and VP22-3 on the controlling bridge 23, respectively.

In a upstream table as shown in Table 1-1, the controlling bridge 23 may record the ECID and the cascaded port and their associated virtual port.

TABLE 1-1

| Key | | Value |
|---|---|---|
| ECID-21-2-1 | 23-1 | VP21-2-1 |
| ECID-21-2-2 | 23-1 | VP21-2-2 |
| ECID-22-2 | 23-2 | VP22-2 |
| ECID-22-3 | 23-2 | VP22-3 |

In a downstream table as shown in Table 2-1, the controlling bridge 23 may record each virtual port and its associated cascaded port and ECID.

TABLE 2-1

| Key | Value | |
|---|---|---|
| VP21-2-1 | ECID-21-2-1 | 23-1 |
| VP21-2-2 | ECID-21-2-2 | 23-1 |
| VP22-2 | ECID-22-2 | 23-2 |
| VP22-3 | ECID-22-3 | 23-2 |

The controlling bridge 23 may send an extended port create response message via the cascaded port 23-1 to notify the port extender 21 of the ECID-21-2-1 assigned to the extended port 21-2-1 and ECID-21-2-2 assigned to the extended port 21-2-2, respectively. The controlling bridge 23 may send the extended port create response message via the cascaded port 23-2 to notify the port extender 22 of the ECID-22-2 assigned to the extended port 22-2 and ECID-22-3 assigned to the extended port 22-3 respectively.

The port extender 21 receives the extended port create response messages, record each extended port and its associated ECID in a upstream table shown in Table 3-1, and record each ECID and its associated extended port in a downstream table shown in Table 4-1.

TABLE 3-1

| Key | Value |
|---|---|
| 21-2-1 | ECID-21-2-1 |
| 21-2-2 | ECID-21-2-2 |

TABLE 4-1

| Key | Value |
|---|---|
| ECID-21-2-1 | 21-2-1 |
| ECID-21-2-2 | 21-2-2 |

The port extender 22 receives the extended port create response message, record each extended port and its associated ECID in a upstream table shown in Table 5-1, and record each ECID and its associated extended port in a downstream table shown in Table 6-1.

TABLE 5-1

| Key | Value |
|---|---|
| 22-2 | ECID-22-2 |
| 22-3 | ECID-22-3 |

TABLE 6-1

| Key | Value |
|---|---|
| ECID-22-2 | 22-2 |
| ECID-22-3 | 22-3 |

The controlling bridge 23 may control the extended port 21-2-1 and the extended port 21-2-2 of the port extender 21 to establish a link with the terminal 25, and may control the extended ports 22-2 of the port extender 22 to establish a link with the terminal 26, and may control the extended ports 22-3 of the port extender 22 to establish a link with the terminal 27.

The controlling bridge 23 may set a link aggregation group 21-2 and a aggregation port LAG21-2 of the link aggregation group 21-2, and associate the aggregation port LAG21-2 with the extended port 21-2-1 and the extended port 21-2-2. In this way, the extended port 21-2-1 and the extended port 21-2-2 are set as two member ports of the aggregation port LAG21-2. The controlling bridge 23 may set the virtual port VP21-2 for the aggregation port LAG21-2 so that the aggregation port LAG21-2 may behave as the virtual port VP21-2 on the controlling bridge 23. The controlling bridge 23 may create an E-channel for the aggregation port LAG21-2. The controlling bridge 23 may assign a ECID-21-2 to the aggregation port LAG21-2 based on the port namespace of the cascaded port 23-1 to identify an E-channel created for the aggregation port LAG21-2.

The controlling bridge 23 may replace the virtual port VP21-2-1 associated with the ECID-21-2-1 and the cascaded port 23-1 in the upstream table with the virtual ports VP21-2, and replace the virtual port VP21-2-2 associated with the ECID-21-2-2 and the cascaded port 23-1 in the upstream table with the virtual ports VP21-2, as shown in Table 1-2:

TABLE 1-2

| Key | | Value |
|---|---|---|
| ECID-21-2-1 | 23-1 | VP21-2 |
| ECID-21-2-2 | 23-1 | VP21-2 |
| ECID-22-2 | 23-2 | VP22-2 |
| ECID-22-3 | 23-2 | VP22-3 |

By associating the ECID-21-2-1 and the cascaded port 23-1 with the virtual port VP21-2 as shown in the upstream table in Table 1-2, the controlling bridge 22 may associate the ECID-21-2-1 and the cascaded port 23-1 with the aggregation port LAG21-2, so as to identify that an ingress port through which an upstream packet received by the extended port 21-2-1 enters the extended bridge 24 is the aggregation port LAG21-2. By associating the ECM-21-2-2 and the cascaded port 23-1 with the virtual port VP21-2 as shown in the upstream table in Table 1-2, the controlling bridge 22 may associate the ECID-21-2-2 and the cascaded port 23-1 with the aggregation port LAG21-2, so as to identify that an ingress port through which an upstream packet received by the extended port 21-2-2 enters the extended bridge 24 is the aggregation port LAG21-2.

In the downstream table as shown in Table 2-2, the controlling bridge 23 may record the virtual port VP21-2 and its associated ECID-21-2 and cascaded port 23-1:

TABLE 2-2

| Key | Value | |
|---|---|---|
| VP21-2-1 | ECID-21-2-1 | 23-1 |
| VP21-2-2 | ECID-21-2-2 | 23-1 |
| VP22-2 | ECID-22-2 | 23-2 |
| VP22-3 | ECID-22-3 | 23-2 |
| VP21-2 | ECID-21-2 | 23-1 |

By associating the virtual port VP21-2 with the ECID-21-2 and the cascaded port 23-1, the controlling bridge 22 may determine to add the ECID-21-2 into a downstream unicast packet of which an egress port exiting the extended bridge 24 is the aggregated port LAG21-2, and determine to send the downstream unicast packet added with the ECID-21-2 via the cascaded port 23-1.

The controlling bridge 23 may send a Port Extender Control and Status Protocol (PE CSP) packet to the port extender 21; wherein the field of the type-length-value (T-L-V) of the PE CSP packet may carry the aggregation port LAG21-2, the ECID-21-2 of the aggregation port LAG21-2, and the extended ports 21-2-1 and 21-2-2 associated with the aggregation port LAG21-2.

After receiving the PE CSP packet, the port extender 21 may record the ECM-21-2 and its associated aggregation port LAG21-2 in the downstream table as shown in Table 4-2.

TABLE 4-2

| Key | Value |
|---|---|
| ECID-21-2-1 | 21-2-1 |
| ECID-21-2-2 | 21-2-2 |
| ECID-21-2 | LAG21-2 |

By associating ECID-21-2 and the aggregation port LAG21-2, the port extender 21 may determine that the egress port through which the downstream unicast packet carrying the ECID21-2 exits the extended bridge 24 is the aggregation port LAG21-2.

The port extender 21 may record the aggregation port LAG21-2 and its associated extended ports 21-2-1 and 21-2-2 in a aggregation port table shown in Table 7.

TABLE 7

| Key | Value |
|---|---|
| LAG21-2 | 21-2-1, 21-2-2 |

The port extender 21 may determine the member ports associated with each aggregation port based on the aggregation port table. The port extender 21 may select extended port 21-2-1 or the extended port 21-2-2 based on the aggregation port table so as to send the downstream unicast packet exiting the extended bridge 24 via the selected extended port.

Figure 2B:
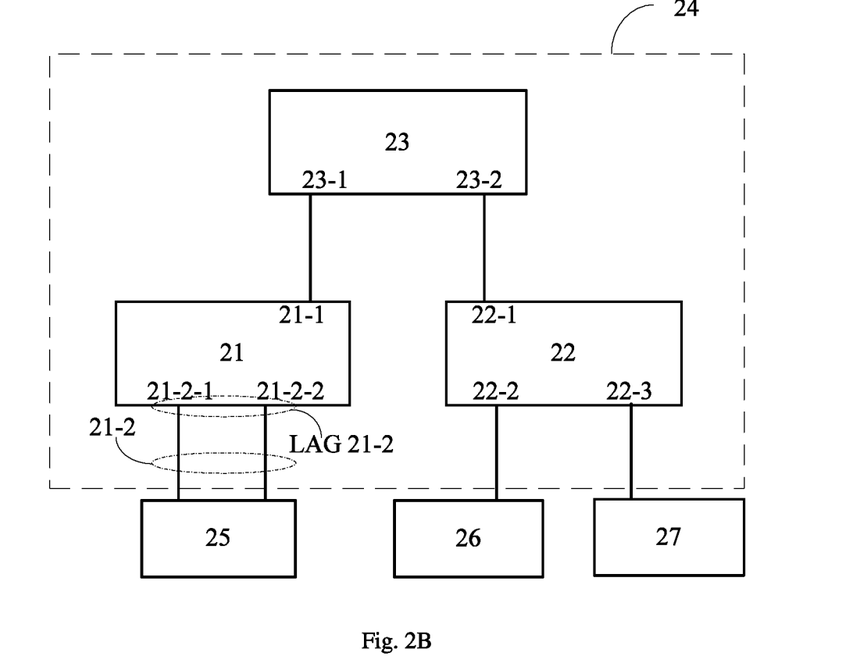

As shown in FIG. 2B, the controlling bridge 23 may set two physical links via which the port extender 21 is connected to the terminal 25 as the link aggregation group 21-2, improving the reliability of the link between the port extender 21 and the terminal 25.

The terminal 25 may select the link connecting the extended port 21-2-1 from the two links connecting the port extender 21 so as to send an Ethernet broadcast packet based on the load sharing algorithm.

The port extender 21 may receive the Ethernet broadcast packet via the extended port 21-2-1, may insert an Extension VLAN Tag (ETAG) whose Extended Port VLAN ID (VID) is ECID-21-2-1 in the Ethernet broadcast packet, and send it via the upstream port 21-1.

The controlling bridge 23 may receive the Ethernet broadcast packet with the ETAG via the cascaded port 23-1, find the virtual port VP21-2 in the upstream table (as shown in Table 1-2) based on the ECID-21-2-1 and the cascaded port 23-1, and determine that the aggregation port LAG21-2 is an ingress port through which the Ethernet broadcast packet enters the extended bridge 24.

The controlling bridge 23 may learn a MAC address entry based on a source MAC address of the Ethernet broadcast packet, an VLAN and the virtual port VP21-2. The controlling bridge 23 may copy the Ethernet broadcast packet. In the present disclosure, the controlling bridge 23 may set a Source Extended Port VLAN ID (SVID) of ETAG inserted to a copied Ethernet broadcast packet as the ECID-21-2, replace the VID of the ETAG with a broadcast ECID, and send it via the cascaded port 23-1. In the present disclosure, the link aggregation group 21-2 of the port extender 21 is connected to the terminal 25, and the controlling bridge 23 determines that the ingress port is the aggregation port LAG21-2 based on the VID of the upstream Ethernet broadcast packet. Accordingly, the controlling bridge 23 may set the ECID21-2 of the aggregation port LAG21-2 in the SVID of the downstream Ethernet broadcast packet and prevents the port extender 21 from sending the downstream broadcast packet to the terminal 25 via the link aggregation group 21-2.

The controlling bridge 23 may set the VID of the ETAG of a copied Ethernet broadcast packet as the broadcast ECID and send it via the cascaded port 23-2. The controlling bridge 23 may assign ECID-21-2 to the aggregation port LAG21-2 based on the port namespace. When the upstream Ethernet broadcast packet received from one cascaded port is to be sent via another cascaded port, it may not have to copy the VID in ETAG of the upstream Ethernet broadcast packet to SVID in ETAG of the downstream Ethernet broadcast packet. The controlling bridge 23 may also assign ECID to the aggregation port LAG21-2 based on global namespace so that when the controlling bridge sends the upstream Ethernet broadcast packet received from one cascaded port is to be sent via another cascaded port, the VID in ETAG of the upstream Ethernet broadcast packet is copied to SVID in ETAG of the downstream Ethernet broadcast packet.

The port extender 21 receives the Ethernet broadcast packet via the upstream port 21-1, wherein VID in ETAG is the broadcast ECID and SVID in the ETAG is the ECID-21-2. If the port extender 21 finds that the port list of the broadcast ECID comprises the aggregation port LAG21-2, and determines that the ECID-21-2 of the SVID corresponds to the aggregation port LAG21-2 in the port list of the broadcast ECID, the broadcast packet is not to be sent via the aggregation port LAG21-2.

The port extender 22 receives the Ethernet broadcast packet via the upstream port 22-1, wherein VID in ETAG is broadcast ECID. The port extender 22 finds that the port list of the broadcast ECID comprises the extended ports 22-2 and 22-3. The port extender removes the ETAG of the received Ethernet broadcast packet, copies the Ethernet broadcast packet, and sends the Ethernet broadcast packet via the extended ports 22-2 and 22-3, respectively, so that the terminals 26 and 27 respectively receive the Ethernet broadcast packet.

The terminal 27 may send an Ethernet broadcast packet. The port extender 22 receives the Ethernet broadcast packet via the extended port 22-2, inserts the ETAG in which VID is ECID-22-2 into the Ethernet broadcast packet based on the ECID-22-2 associated with extended port 22-2 in the upstream table (as shown in Table 5-1), and sends it via the upstream port 22-1.

The controlling bridge 23 may receive the Ethernet broadcast packet with the ETAG via the cascaded port 23-2, find the virtual port VP22-2 in the upstream table (as shown in Table 1-2) based on ECID-22-2 and the cascaded port 23-2, and determine the MAC address entry based on the source MAC address of the Ethernet broadcast packet, VLAN and the virtual port VP22-2. The controlling bridge 23 copies the Ethernet broadcast packet. The controlling bridge 23 may copy the ECID-22-2 of the VID of the ETAG of one copied Ethernet broadcast packet to the SVID, replace the VID of the ETAG with the broadcast ECID, and send the packet via the cascaded port 23-2. In the present disclosure, if the controlling bridge 23 determines that the ECID-22-2 is the ECID of a single extended port, the ECID-22 of the VID can be directly copied to the SVID to prevent the Ethernet broadcast packet from being sent back to the terminal 27.

The controlling bridge 23 may set an broadcast ECID as VID of the ETAG of one copied Ethernet broadcast packet and send the packet via the cascaded port 23-1.

The port extender 22 receives, via the upstream port 22-1, an Ethernet broadcast packet of which VID of the ETAG is the broadcast ECID, finding that the port list of the broadcast ECID comprises the extended ports 22-2 and 22-3. The port extender 21 may determine that the ECID-22-2 in the SVID corresponds to the extended port 22-2 included in the port list of the broadcast ECID. The port extender 22 may remove the ETAG from the Ethernet broadcast packet, and send the Ethernet broadcast packet via the extended port 22-2, so that the Ethernet broadcast packet may be broadcast to the terminal 26.

The port extender 21 receives, via the upstream port 21-1, an Ethernet broadcast packet of which VID of the ETAG is an broadcast ECID, finding that the port list of the broadcast ECID comprises the LAG21-2. The port extender 21 removes the ETAG from the Ethernet broadcast packet, selects the extended port 21-2-2 from the extended ports 21-2-1 and 21-2-2 associated with the aggregation port LAG21-2 shown in Table 7 based on the load sharing algorithm, and sends the Ethernet broadcast packet via the extended port 21-2-2, so that the Ethernet broadcast packet can be sent to the terminal 25.

The above Ethernet broadcast packet may be either a data packet or a protocol packet, such as an ARP request packet.

The terminal 27 sends an Ethernet unicast packet to the terminal 25, wherein a source MAC address is MAC 27 being a MAC address of the terminal 27 and a destination MAC address is MAC 25 being a MAC address of the terminal 25. The port extender 22 may receive an Ethernet unicast packet via the extended port 22-2, find the ECM-22-2 in the upstream table (as shown in Table 5-1) based on the extended port 22-2, insert the ETAG in which VID is the ECID-22-2 in the Ethernet unicast packet, and send the packet with the ETAG via the upstream port 22-1.

The controlling bridge 23 may receive the Ethernet unicast packet with the ETAG via the cascaded port 23-2, and find a matching virtual port VP21-2 based on the destination MAC address MAC 25 and VLAN of the received packet. That is, the controlling bridge 23 determines that the aggregation port LAG21-2 associated with the virtual port VP21-2 is an egress port based on the learned MAC address.

In the downstream table (as shown in Table 2-2), the controlling bridge 23 may find the ECID-21-2 and the cascaded port 23-1 based on the virtual port VP21-2, determine to add the ECID-21-2 into the Ethernet unicast packet and determine to send the Ethernet unicast packet added with the ECID-21-2 via the cascaded port 23-1. The controlling bridge 23 modifies the VID, indicating the egress port which is in the ETAG added to the Ethernet unicast packet, into ECM-21-2 and sends the packet via the cascaded port 23-1.

The port extender 21 receives the Ethernet unicast packet of which the VID in the ETAG is ECID-21-2 via the upstream port 21-1, finding the LAG21-2 in the downstream table (as shown in Table 4-2) based on the ECID-21-2. The port extender 21 may remove the ETAG, select the extended port 21-2-1 from the extended ports 21-2-1 and 21-2-2 (as shown in Table 7) associated with the aggregation port LAG21-2 based on the load sharing algorithm, and send the Ethernet unicast packet to the terminal 25 via the extended port 21-2-1.

The above Ethernet unicast packet may be either a data packet or a protocol packet, such as an ARP response packet. In the extended bridge 24 in FIG. 2B, the controlling bridge 23 may find the virtual port VP21-2 based on a destination MAC address of an Ethernet unicast packet being received from an external two-layer network, and send the downstream Ethernet unicast packet via the cascaded port 23-1, wherein the VID in the ETAG is ECID-21-2. The port extender 21 may send the downstream Ethernet unicast packet via the link aggregation group 21-2. Refer to the above description for details, which will not be described in detail herein.

The controlling bridge 23 may achieve the load sharing of both upstream packets sent to the port extender 21 by the terminal 25 and downstream packets sent to the terminal 25 by the port extender 21 by setting the link aggregation group 21-2.

In the system shown in FIGS. 2A and 2B, an upstream packet entering the extended bridge 24 via the port extenders 21 or 22 can be unicast packet and non-unicast packet; the downstream packet exiting the extended bridge 24 via the port extenders 21 or 22 can be unicast packet and non-unicast packet.

Figure 3A:
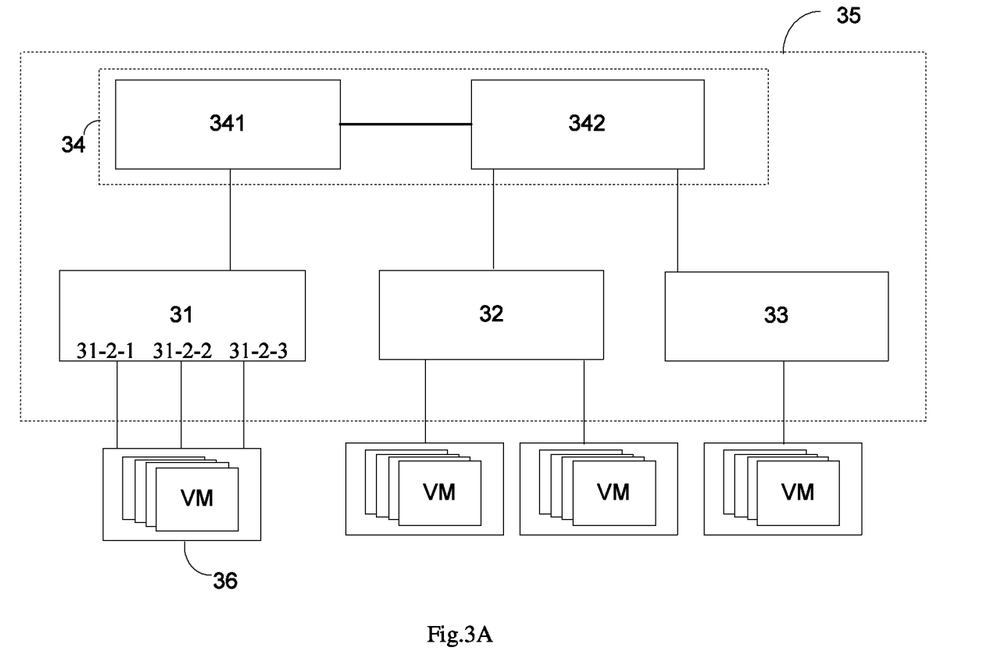
FIGS. 3A and 3B are diagrams of another example of extended bridge setting a link aggregation group according to the present disclosure.

As shown in FIG. 3A, the network devices 341 and 342 may form a stacking device 34 via a stacking link. The network devices 341 and 342 may perform a master device election, and the network device 342 may be elected as the master device of the stacking device 34. The stacking device 34 operates as a controlling bridge 34. The port extenders 31 to 33 and the controlling bridge 34 form an extended bridge 35.

An upstream port of the port extender 31 may be connected with a cascaded port of the network device 341 via a link; an upstream port of the port extender 32 may be connected with a cascaded port of the network device 342 via a link. An upstream port of the port extender 33 may be connected with another cascaded port of the network device 342 via a link.

The port extender 31 may send extended port create request messages to the controlling bridge 34 for the extended ports 31-2-1, 31-2-2 and 31-2-3, respectively. The port extender 31 may send these extended port create request messages to the network device 341 via upstream port. The network device 341 may send the extended port create request messages to the network device 342 via the stacking link.

The network device 342 may receive the extended port create request messages from the port extender 31 via the stacking link, create E-channels for the three extended ports 31-2-1, 31-2-2 and 31-2-3, respectively, and assign ECID-31-2-1, ECID-31-2-2, and ECID-31-2-3 respectively to the three extended ports based on the port namespace of the cascaded port of the network device 341 to identify an E-channel created for each of the extended ports 31-2-1, 31-2-2 and 31-2-3. The controlling bridge 34 may set virtual ports for the extended ports 31-2-1, 31-2-2 and 31-2-3, respectively, so that the extended ports 31-2-1, 31-2-2 and 31-2-3 behave as these virtual ports on the controlling bridge 34.

The controlling bridge 34 may send extended port create response messages to the port extender 31, and notify the port extender 31 of the ECIDs assigned to the three extended ports 31-2-1, 31-2-2 and 31-2-3. The network device 342 may send these extended port create response messages via stacking link. The network device 341 may send these extended port create response messages via the cascaded port. The port extender 31 may receive these extended port create response messages via the upstream port.

The network device 342 may receive the extended port create request messages from the port extenders 32 and 33 via two cascaded ports, respectively, and may send the extended port create response messages to the port extenders 32 and 33, respectively, via the cascaded ports. The controlling bridge 34 creates extended ports for the port extenders 32 and 33 in the same manner, which will not be described in detail herein.

The controlling bridge 34 may control the extended port 31-2-1, the extended port 31-2-2, and the extended port 31-2-3 of the port extender 31 to establish a link with the terminal 36. In FIG. 3A, the terminal 36 may be a server running virtual machines.

The controlling bridge 34 may set the link aggregation group 31-2 and the aggregation port LAG31-2 of the link aggregation group 31-2, associate the aggregation port LAG31-2 with the extended port 31-2-1, the extended port 31-2-2, and the extended port 31-2-3, that is, three member ports of the aggregation port LAG31-2, and set a virtual port of the aggregation port LAG31-2 so that the aggregation port LAG31-2 behaves as the virtual port on the controlling bridge 34. The controlling bridge 34 may create an E-channel for the aggregation port LAG31-2. The controlling bridge 34 assigns the ECID-31-2 to the aggregation port LAG31-2 based on the port namespace of the cascaded port of the network device 341 to identify the E-channel created for the aggregation port LAG31-2.

The controlling bridge 34 may send a PE CSP packet to the port extender 34, wherein the T-L-V field of the PE CSP packet carries the aggregation port LAG31-2, the ECID-31-2 of the aggregation port LAG31-2, and the extended ports 31-2-1, 31-2-2, and 31-2-3 associated with the aggregation port LAG31-2.

The port extender 31 records a corresponding relationship between the aggregation port LAG31-2 and the extended port 31-2-1, the extended port 31-2-2, and the extended port 31-2-3 to determine member ports of the aggregation port LAG31-2.

Figure 3B:
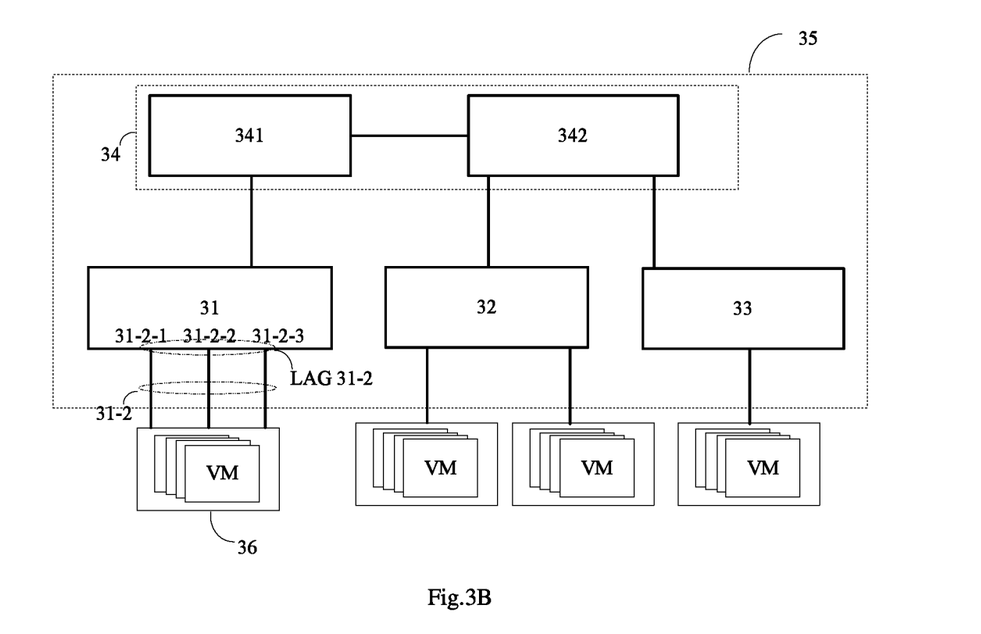

As shown in FIG. 3B, the controlling bridge 34 set the three physical links via which the port extender 31 is connected with the terminal 36 as the link aggregation group 31-2, improving the reliability of the link between the port extender 31 and the terminal 36.

When the port extender 31 detects that the extended port 31-2-2 has failed, a PE CSP packet may be sent to the controlling bridge 34, wherein the T-L-V field of the PE CSP packet carries the ECID-31-2-2 and the failure indication information.

The controlling bridge 34 receives the PE CSP packet notifying that the extended port 31-2-2 fails, and may send to the port extender 31 the PE CSP packet that notifies the deletion of the association relationship, wherein the T-L-V field carries the ECID-31-2 and the ECID 31-2-2, and indication information of deleting the association relationship.

The controlling bridge 34 receives the PE CSP packet notifying the deletion of the association relationship, and may delete the extended port 31-2-2 from the three extended ports of the aggregation port LAG31-2 associated with the ECID-31-2.

The controlling bridge 34 may retain the E-channel and ECID-31-2-2 set for the extended port 31-2-2, so as to prevent the E-channel and ECID from being repeatedly set when the extended port 31-2-2 restores. Alternatively, the controlling bridge 34 deletes the E-channel and ECID-31-2-2 set for the extended port 31-2-2.

The port extender 31 may detect that the extended port 31-2-2 is restored and then send the extended port create message. The controlling bridge 34 may notify the port extender 31 of these retained E-channels and ECIDs through extended port create response message. Alternatively, the port extender 31 may set the E-channel for the extended port 31-2-2, assign the ECID, and set the virtual port. The controlling bridge 34 may notify the port extender 31 of retaining the ECID or reassigning the ECID through extended port create response message.

The controlling bridge 34 may control the extended port 31-2-2 to establish a link with the terminal 36. The controlling bridge 34 determines to associate the aggregation port LAG31-2 with the extended ports 31-2-1, 31-2-2 and 31-2-3 and sends PE CSP packet. The T-L-V field of the PE CSP packet carries the aggregation port LAG31-2, the ECID-31-2 of the aggregation port LAG31-2, and the extended ports 31-2-1, 31-2-2, and 31-2-3 associated with the aggregation port LAG31-2.

The port extender 31 receives PE CSP packet notifying the link aggregation group 31-2, and records that the member port of the aggregation port LAG 31-2 comprises the extended ports 31-2-1, 31-2-2, and 31-2-3. The controlling bridge 34 sends the downstream Ethernet broadcast packet and the downstream Ethernet unicast packet in the same manner as the controlling bridge 23 in the FIG. 2B sends the downstream Ethernet broadcast packet and the downstream Ethernet unicast packet. The port extender 31 sends the downstream packet and the upstream packet in the same manner as the port extender 21 in FIG. 2B sends the downstream packet, such as the downstream Ethernet broadcast packet and the downstream Ethernet unicast packet, and the upstream packet, such as the upstream Ethernet broadcast packet and the upstream Ethernet unicast packet. This will not be described in detail herein. In FIG. 3B, the link aggregation group 31-2 improve the reliability of the link between the port extender 31 and the terminal 36, and load share the upstream packet sent from the terminal 36 to the port extender 31 and the downstream packet sent from the port extender 31 to the terminal 36.

Figure 4:
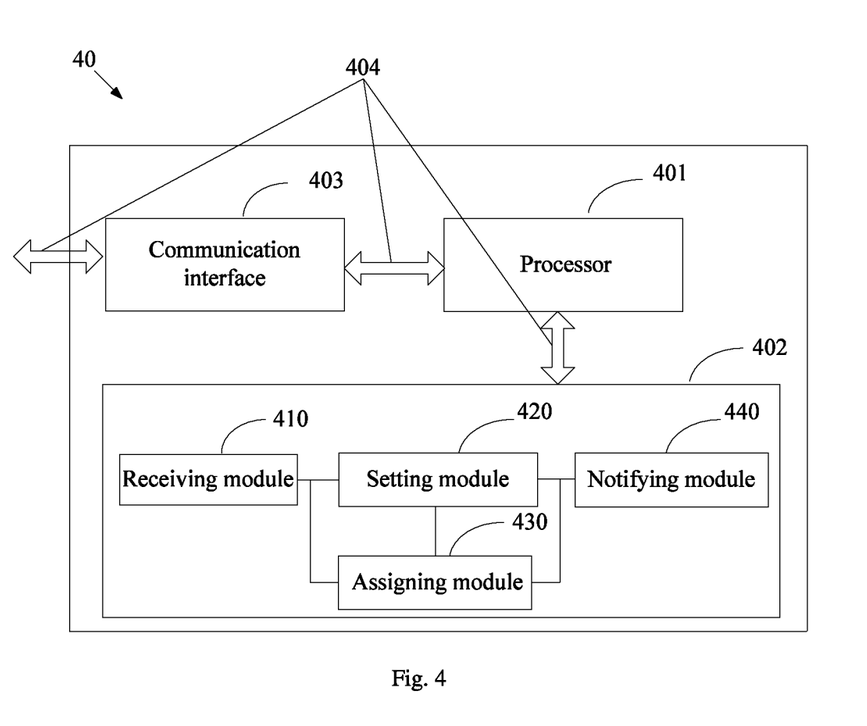
FIG. 4 is a block diagram of an example device for setting a link aggregation group according to the present disclosure.

FIG. 4 shows a block diagram of an example controlling bridge 40. The controlling bridge 40 may comprise a processor 401, a non-temporary storage medium 402, a communication interface 403, and a coupling mechanism 404 that couples the processor 401, the non-temporary storage medium 402, and the communication interface 403. The non-temporary storage medium 402 stores a plurality of machine-executable instruction modules executed by the processor 401. The machine-executable instruction modules may comprise a receiving module 410, a setting module 420, an assigning module 430, and a notifying module 440.

The setting module 420 sets a link aggregation group, and associates an aggregation port of the link aggregation group with a plurality of extended ports of a port extender, wherein the plurality of extended ports of the port extender are connected to a same terminal. The assigning module 430 assigns an aggregation port identifier to the aggregation port; associates an extended port identifier for each of the plurality of extended ports and a cascaded port connecting to the port extender with the aggregation port to identify an ingress port through which an upstream packet received by any of the plurality of extended ports enters the extended bridge is the aggregation port; and associates the aggregation port with the aggregation port identifier and the cascaded port to determine to add the aggregation port identifier into a downstream unicast packet of which an egress port exiting the extended bridge is the aggregated port, and determine to send the downstream unicast packet added with the aggregation port identifier via the cascaded port.

The notifying module 440 notifies the port extender of the aggregation port and the aggregation port identifier; and notifies the port extender that the aggregation port is associated with the plurality of extended ports.

The receiving module 410 receives a request to create the plurality of extended ports which is sent by the port extender. The assigning module 430 assigns an extended port identifier to each of the plurality of extended ports. The notifying module 440 notifies the extended port identifier assigned for each of the extended ports to the extended port.

The receiving module 410 receives a failure notification sent by the port extender. The assigning module 430 determines that a fault extended port indicated by the failure notification is one of the plurality of extended ports, and deletes an association which associates the extended port identifier of the fault extended port and the cascaded port connecting to the port extender with the aggregation port. The notifying module 440 notifies the port extender of deleting an association between the aggregation port and the fault extended port.

The foregoing is merely illustrative of the preferred examples of the present disclosure and is not intended to be limiting of the present disclosure. Any modifications, equivalent substitutions, improvements, etc., which are made within the spirit and principals of the present disclosure shall fall within the scope of protection of the present disclosure.

The invention claimed is:

1. A method of setting a link aggregation group, the method being applied to a controlling bridge, the controlling bridge and a port extender forming an extended bridge, wherein the method comprises:
    setting a link aggregation group;
    associating an aggregation port of the link aggregation group with a plurality of extended ports of the same port extender, wherein the plurality of extended ports is connected to a same terminal and has different extended port identifiers;
    assigning an aggregation port identifier to the aggregation port;
    associating a respective extended port identifier for each of the plurality of extended ports and a cascaded port connecting to the port extender with the aggregation port so that an ingress port through which an upstream packet received by any of the plurality of extended ports enters the extended bridge is identified as the aggregation port based on any extended port identifier carried in the upstream packet; and
    associating the aggregation port with the aggregation port identifier and the cascaded port to determine to add the aggregation port identifier into a downstream unicast packet of which an egress port for exiting the extended bridge is the aggregation port and to determine to send the downstream unicast packet added with the aggregation port identifier via the cascaded port.

2. The method according to claim 1, wherein the method further comprises:
    notifying the port extender of the aggregation port and the aggregation port identifier; and
    notifying the port extender that the aggregation port is associated with the plurality of extended ports.

3. The method according to claim 1, wherein prior to setting the link aggregation group, the method further comprises:
    receiving requests for creating the plurality of extended ports from the port extender;
    assigning the respective extended port identifier to each of the plurality of extended ports; and
    notifying the port extender of each of the plurality of extended ports and the extended port identifier assigned for each of the plurality of extended ports.

4. The method according to claim 1, wherein the method further comprises:
    receiving a failure notification sent from the port extender;
    determining that a fault extended port indicated by the failure notification is one of the plurality of extended ports;
    deleting an association of an extended port identifier of the fault extended port and the cascaded port with the aggregation port; and
    notifying the port extender to delete an association of the aggregation port with the fault extended port.

5. A device for setting a link aggregation group, the device being applied to a controlling bridge, and the controlling bridge and a port extender forming an extended bridge, wherein the device comprises:
    a setting module is to set the link aggregation group, and associate an aggregation port of the link aggregation group with a plurality of extended ports of the same port extender, wherein the plurality of extended ports is connected to a same terminal and has different extended port identifiers; and
    an assigning module is to
        assign an aggregation port identifier to the aggregation port; associate a respective extended port identifier for each of the plurality of extended ports and a cascaded port connecting to the port extender with the aggregation port so that an ingress port through which an upstream packet received by any of the plurality of extended ports enters the extended bridge is identified as the aggregation port based on any extended port identifier carried in the upstream packet; and
        associate the aggregation port with the aggregation port identifier and the cascaded port to determine to add the aggregation port identifier into a downstream unicast packet of which an egress port for exiting the extended bridge is the aggregation port, and determine to send the downstream unicast packet added with the aggregation port identifier via the cascaded port.

6. The device according to claim 5, wherein the device further comprises:
a notifying module to notify the port extender of the aggregation port and the aggregation port identifier; and to notify the port extender that the aggregation port associates with the plurality of extended ports.

7. The device according to claim 5, wherein the device further comprises:
a receiving module is to receive requests for creating the plurality of extended ports from the port extender;
the assigning module assigns the respective extended port identifier to each of the plurality of extended ports; and
the notifying module is to notify the port extender of each of the plurality of extended ports and the extended port identifier assigned for each of the plurality of extended ports.

8. The device according to claim 5, wherein
the receiving module is to receive a failure notification sent from the port extender;
the assigning module is to determine that a fault extended port indicated by the failure notification is one of the plurality of extended ports, and delete an association of an extended port identifier of the fault extended port and the cascaded port with the aggregation port; and
the notifying module is to notify the port extender to delete an association of the aggregation port with the fault extended port.

9. An extended bridge system, comprising:
a controlling bridge and a port extender;
wherein a cascaded port of the controlling bridge is connected to an upstream port of the port extender, and
wherein a plurality of extended ports of the same port extender is connected to a same terminal and has different extended port identifiers; and
wherein the controlling bridge is to
set a link aggregation group,
associate an aggregation port of the link aggregation group with the plurality of extended ports,
assign an aggregation port identifier to the aggregation port,
associate a respective extended port identifier for each of the plurality of extended ports and a cascaded port connecting to the port extender with the aggregation port so that an ingress port through which an upstream packet received by any of the plurality of extended ports enters the extended bridge is identified as the aggregation port based on any extended port identifier carried in the upstream packet, and
associate the aggregation port with the aggregation port identifier and the cascaded port to determine to add the aggregation port identifier into a downstream unicast packet of which an egress port exiting the extended bridge is the aggregation port, and to determine to send the downstream unicast packet added with the aggregation port identifier via the cascaded port.

10. The system according to claim 9, wherein
the controlling bridge is to notify the port extender of the aggregation port and the aggregation port identifier, and notify the port extender that the aggregation port is associated with the plurality of extended ports;
the port extender is to record an association of the aggregation port identifier with the aggregation port to determine that the egress port of the downstream unicast packet carrying the aggregation port identifier is the aggregation port; and
the port extender is to record the plurality of extended ports are member ports of the aggregation port, so as to select one of the plurality of extended ports for sending the downstream unicast packet of which the egress port exiting the extended bridge is the aggregation port, and so as to select one of the plurality of extended ports for sending a downstream non-unicast packet of which the egress port exiting the extended bridge is the aggregation port.

11. The system based on claim 9, wherein
the port extender is to send requests for creating the plurality of extended ports to the controlling bridge;
the controlling bridge is to receive the requests for creating the plurality of extended ports, assign the respective extended port identifier to each of the plurality of extended ports, and notify the port extender of each of the plurality of extended ports and the extended port identifier assigned for each of the plurality of extended ports; and
the port extender is to receive each of the extended ports and the extended port identifiers respectively assigned for the extended ports, and record each of the extended ports and the extended port identifiers respectively assigned for the extended ports to determine to add the extended port identifier assigned for each of the extended ports to the upstream packet received by the extended port.

12. The system based on claim 9, wherein
the port extender is to send a failure notification;
the controlling bridge is to receive the failure notification, determine that a fault extended port indicated by the failure notification is one of the plurality of extended ports, delete an association which associates an extended port identifier of the fault extended port and the cascaded port with the aggregation port, and notify the port extender to delete an association of the aggregation port with the fault extended port; and
the port extender is to delete the fault extended port from member ports of the aggregation port to delete the association between the aggregation port and the fault extended port.

* * * * *